Patented May 12, 1936

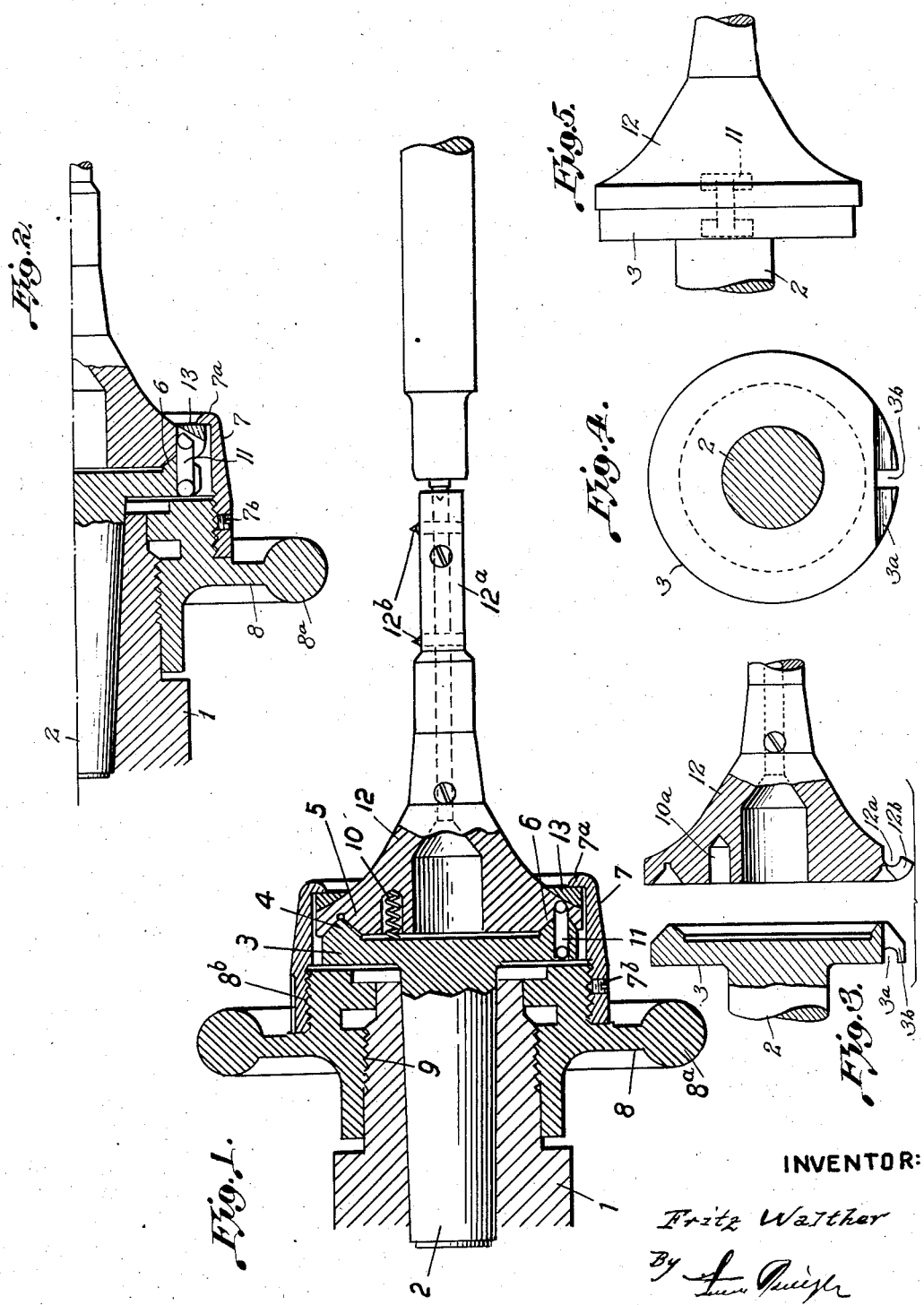

2,040,225

UNITED STATES PATENT OFFICE 2,040,225

CHUCK

Fritz Walther, Plauen in Vogtland, Germany, assignor to Vomag-Betriebs-A. G., Plauen in Vogtland, Germany Application September 17, 1934, Serial No. 744,458
In Germany July 4, 1932

3 Claims. (Cl. 77—56)

In boring machines for fine work, it is known to employ a two-part boring bar, the one part of which, to which the tool is attached, being hinged to the other part so that the worked surface of the work-piece is prevented from being damaged when the work-piece is withdrawn from the tool or this is withdrawn from the work-piece. In the known boring devices the tool carrier is a spindle held between centres and a sleeve is provided which partly surrounds one of the centres and the tool carrier and has a feather that engages a corresponding groove of the tool holder in order to carry the latter around with it. This device has the disadvantages that in order to disconnect the parts concerned, the boring spindle must always be brought into a certain definite position, also the position of the tool is not maintained sufficiently accurately owing to its being clamped between centres.

The above-mentioned disadvantages are obviated in my improved chuck forming the subject matter of the present invention. I attain the object in view by providing one of the two parts of the boring rod with an annular projection and the other part with a correspondingly shaped groove, said projection engaging said groove similar to feather and groove, but the shape of these parts being such that they are centered with respect to one another, and there is, furthermore, provided a clamping sleeve which surrounds the interengaging parts and connects them rigidly with one another when it has been screwed tight, while it permits turning the tool-carrying part about the hinge relatively to the other part when said sleeve has been loosened and unscrewed. By designing the chuck in this manner I attain at the same time the further advantage that the boring rod can be used in overhung position whereby the fixing of the tool is considerably simplified.

The invention is illustrated diagrammatically and by way of example on the accompanying drawing in which Figure 1 shows an axial section of a chuck designed according to this invention.

Fig. 2 shows a part of Fig. 1 on a larger scale.

Fig. 3 shows the adjacent ends of the two parts of the boring rod to be connected by a hinge partly in section.

Fig. 4 is an end view of Fig. 3 seen from the left-hand side, and

Fig. 5 is a plan of Fig. 3, the two parts of the boring rod being in engagement with each other.

In the drawing, 1 denotes the boring spindle which is driven by any suitable means, and has in its free end a slightly conical bore into which is inserted a correspondingly conical pivot 2. The free end of the spindle 1 is, furthermore, provided with an exterior thread 9 onto which is screwed a large nut 8 combined with a hand-wheel 8ª. The nut portion located in front of said hand-wheel (right hand from the same in the figure) is likewise provided with an exterior thread 8ᵇ and an interiorly threaded cap 7 is screwed upon said thread 8ᵇ and can be secured in its position thereon by a set-screw 7ᵇ. The cap 7 has at its free rim an inwardly directed flange 7ª which bears on an intermediate ring 13 inserted between said flange and an enlarged portion 5 of the tool holder 12 to which is attached the tool 12ª which, in the example shown, is provided with diamonds 12ᵇ. In the portion 5 of the tool holder is an annular groove 6 of prismatic transverse section, and opposite said portion 5 is a disk-like enlargement 3 of the pivot 2; this enlargement has an annular rib 4 with conical surfaces fitting the complementarily formed surfaces of the groove 6 for centering the two parts 3 and 5, or 2 and 12 when the cap 7 is screwed home on the nut 8, the flange 7ª of the cap then pressing the intermediate ring 13 onto the portion 5 of the tool holder 12. The disk 3 and the tool holder 5, 12 are connected with one another by a hinge 11, having an I-like form; the two parallel legs of the hinge engage semi-circular grooves 3ª and 12ª of the disk 3 and the tool-holder 12, respectively, and the middle leg lies within a groove 3ᵇ and 12ᵇ of the two mentioned parts. Diametrically opposite the hinge is provided a helical compressive spring 10 which lies in a recess 10ª in the part 12 and tends to turn the tool holder on said hinge and turns it away from the disk when the nut 8 is turned in counter-clockwise direction by means of the hand-wheel 8ª.

I wish it to be understood that I do not limit myself to the constructional form shown in the drawing merely by way of example. Various departures in the details are possible without departing from the invention.

I claim:—

1. A chuck comprising a driving member, a two-part boring rod comprising a part to be attached to the driving member and a part to which a tool is to be attached, an annular tapered rib on one of said parts engaging a complimentarily shaped groove in the other of said two parts, said rib and groove being concentrically disposed with respect to the axis of the chuck and the boring rod, a hinge connecting said parts with one another in such a manner that the part carrying the tool is movable transversely to the longitudinal axis of the boring rod, and means engaging the driving member for pressing the two boring rod parts against one another and also securing them to the driving member.

2. A chuck comprising a driving member, a two-part boring rod comprising a part to be attached to the driving member and a part to which a tool is to be attached, an annular tapered rib on one of said parts engaging a complimentarily shaped groove in the other of said two parts, said rib and groove being concentrically disposed with respect to the axis of the chuck and the boring rod, a hinge connecting these parts with one another in such a manner that the part carrying the tool is movable transversely to the longitudinal axis of the boring rod, a nut screwed upon the driving member of the chuck, and a cap screwed upon said nut and having a flange overlapping the tool-carrying part of the boring rod.

3. A chuck comprising a driving member, a two-part boring rod comprising a part to be attached to the driving member and a part to which a tool is to be attached, an annular tapered rib on one of said parts engaging a complimentarily shaped groove in the other of said two parts, said rib and groove being concentrically disposed with respect to the axis of the chuck and the boring rod, a hinge connecting these two parts with one another in such a manner that the part carrying the tool is movable transversely to the longitudinal axis of the boring rod, a compressive spring arranged between said parts at a place diametrically opposite to said hinge, and means engaging the driving member for pressing the two boring rod parts against one another and also securing them to the driving member.

FRITZ WALTHER.